US009009762B2

(12) United States Patent
Kim et al.

(10) Patent No.: US 9,009,762 B2
(45) Date of Patent: Apr. 14, 2015

(54) DIGITAL VIDEO BROADCASTING—SATELLITE—SECOND GENERATION (DVB-S2) BASED TRANSMISSION AND RECEPTION APPARATUS AND METHOD OPERABLE IN CIRCUMSTANCES OF LOW SIGNAL TO NOISE RATIO (SNR)

(71) Applicant: Electronics and Telecommunications Research Institute, Daejeon (KR)

(72) Inventors: Pan Soo Kim, Daejeon (KR); Deock Gil Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/018,361

(22) Filed: Sep. 4, 2013

(65) Prior Publication Data
US 2014/0082675 A1    Mar. 20, 2014

(30) Foreign Application Priority Data

Sep. 20, 2012 (KR) .................. 10-2012-0104412
Feb. 21, 2013 (KR) .................. 10-2013-0018363

(51) Int. Cl.
*H04N 7/20* (2006.01)
*H04N 21/61* (2011.01)
*H04L 27/26* (2006.01)
*H04N 21/2383* (2011.01)

(52) U.S. Cl.
CPC ........ *H04N 21/6193* (2013.01); *H04L 27/2601* (2013.01); *H04N 21/2383* (2013.01)

(58) Field of Classification Search
None
See application file for complete search history.

(56) References Cited

U.S. PATENT DOCUMENTS

| 7,839,940 B2 * | 11/2010 | Borran et al. ............... 375/260 |
| 2010/0046415 A1 * | 2/2010 | Kim et al. ............... 370/315 |
| 2010/0118920 A1 | 5/2010 | Kim et al. |
| 2011/0255571 A1 * | 10/2011 | Caffrey et al. ............... 375/141 |
| 2012/0287846 A1 * | 11/2012 | Becker et al. ............... 370/315 |

FOREIGN PATENT DOCUMENTS

KR    10-2013-0088562 A    8/2013

OTHER PUBLICATIONS

Alfredo Vernucci et al., "Techniques for Supporting Communications under Heavy Fading Conditions for Next Generation DVB-RCS Systems", 15th Ka and Broadband Communications Navigation and Earth Observation Conference, Sep. 23, 2009.

* cited by examiner

Primary Examiner — Pinkal R Chokshi
Assistant Examiner — Alexander Gee

(57) ABSTRACT

Provided is a digital video broadcasting-satellite-second generation (DVB-S2) based transmission and reception apparatus and method operable in circumstances of a low signal to noise ratio (SNR), the DVB-S2 based transmission and reception apparatus including a DVB-S2 based transmitter, a mapping unit to determine bit mapping based on at least one of a state of a transmission channel and an area to be applied, and a physical layer frame (PLframe) replica processing unit to repeat a PLframe in which a physical layer header (PLheader) corresponding to a spreading factor (SF) is inserted.

10 Claims, 8 Drawing Sheets

800

DIGITAL VIDEO BROADCASTING—SATELLITE—SECOND GENERATION (DVB-S2) BASED TRANSMISSION AND RECEPTION APPARATUS AND METHOD OPERABLE IN CIRCUMSTANCES OF LOW SIGNAL TO NOISE RATIO (SNR)

CROSS-REFERENCE TO RELATED APPLICATIONS

This application claims the benefit of Korean Patent Application No. 10-2012-0104412, filed on Sep. 20, 2012, and Korean Patent Application No. 10-2013-0018363, filed on Feb. 21, 2013, in the Korean Intellectual Property Office, the disclosures of which are incorporated herein by reference.

BACKGROUND

1. Field of the Invention

The present invention relates to technical concept applicable without changing an existing network as a transmission and reception technology operable in circumstances of a low signal to noise ratio (SNR) to an existing satellite communication network.

2. Description of the Related Art

A conventional digital video broadcasting-satellite-second generation (DVB-S2) transmission system may perform transmission suitable for a channel environment in which a signal to noise ratio (SNR) ranges from −2.35 decibels (dB) to about 16 dB. However, in a case of satellite communication, an extremely low SNR may occur due to a rainfall environment and a difficulty in installation of an antenna, and a mobile terminal may have an interference effect on an adjacent channel due to an antenna pointing error when a signal with a high SNR is transmitted. Accordingly, when a satellite signal is received and transmitted, the signal is to be transmitted in an environment of an extremely low SNR. In a case of currently used DVB-S2 standards, since a great number of transceivers are already installed, performing a new framework may be impossible. Accordingly, a frame is to be configured to not affect existing equipment.

As one associated technology, a band spread technology may be expected. A conventional band spread technology requires a separate device for a band spread function and thus, a receiver in which the band spread function is not supported may have a difficulty in receiving data.

In general, satellite communication is operated with a fixed bandwidth. The band spread technology refers to a technology that spreads a bandwidth of a signal to transmit low signal power. Among various methods of spreading a bandwidth, a relatively simple method may be a technology that increases an intensity of a signal by transmitting identical data repeatedly and combining such data at a reception end.

Accordingly, in order to use the general band spread technology and other technologies, simultaneously, an amount of data of a signal of which a band is to be spread in a fixed bandwidth may be reduced. In this example, when the amount of the data is reduced due to a form of DVB-S2, a number of dummy frames may be generated. Based on such concept, the dummy frames may be replaced with a form in which an existing signal frame repeats.

In general, the band spread technology may expect a symbol replica technology of a time domain, a frame replica technology, and a frequency replica technology.

In the frequency replica technology, a non-linear amplifier may be used for satellite communication. Accordingly, inter-modulation distortion may occur and thus, it may be difficult to apply a multicarrier technology.

The symbol replica technology has been known as a direct sequence band spread. However, a conventional DVB-S2 receiver may be unable to receive a signal of such a waveform.

In a case of the frame replica technology, reception may be impossible in an environment of a low SNR.

When reception signals are accumulated synchronously, such reception may be possible. However, in a case of an adaptive coding and modulation (ACM) technology of DVB-S2, a length of a frame may differ and thus, synchronous accumulation may be impossible.

When communication is performed in a conventional environment of a low SNR, transmission may be possible through symbol replica or channel encoding. In a case of the symbol replica, a scrambling process may be performed in order to guarantee a spectral flatness. A simple implementation may be possible by performing a process of accumulating repeated symbols. The channel encoding technology may be the most robust technology for increasing performance in an environment of a low SNR. However, when a carrier recovery is impossible due to a low intensity of a reception signal, the channel encoding technology may be inapplicable.

The foregoing two technologies may be implemented readily using a conventional narrow band or wide band service. However, the two technologies may be difficult to apply while maintaining a coexistence with the conventional service.

When the two technologies are applied, a separate network may be necessary and thus, an issue of backward compatibility with respect to an existing user may arise. An issue may be resolved by introducing the frame replica technology into a modulation and demodulation method for satellite communication having a wide-ranging SNR.

SUMMARY

According to an aspect of the present invention, there is provided a digital video broadcasting-satellite-second generation (DVB-S2) based transmission and reception apparatus, including a DVB-S2 based transmitter, a mapping unit to determine bit mapping based on at least one of a state of a transmission channel and an area to be applied, and a physical layer frame (PLframe) replica processing unit to repeat a PLframe in which a physical layer header (PLheader) corresponding to a spreading factor (SF) is inserted.

The mapping unit may perform at least one of $\pi/2$ binary phase shift keying (BPSK), quadrature phase shift keying (QPSK), 8-phase shift keying (PSK), 16-amplitude phase shift keying (APSK), and 32-APSK constellations.

The mapping unit may perform gray mapping in $\pi/2$ BPSK, QPSK, and 8-PSK constellations.

The apparatus may further include a PLheader processing unit to configure a spread frame having a length of 16,290 symbols by adding the PLheader through $\pi/2$ BPSK modulation and 16K low-density parity-check (LDPC) encoding, and replace an existing modulation and coding (MODCOD) frame with the configured spread frame.

The apparatus may further include a physical layer (PL) framing and modulation unit to configure a PLframe by performing synchronization with a forward error correction (FEC) frame corresponding to a block code, inserting a dummy frame in order to maintain a symbol rate, and inserting a pilot symbol for carrier recovery of a receiver, a PLheader corresponding to modulation/encoding rate information, and frame synchronization.

The apparatus may further include a DVB-S2 based receiver.

The DVB-S2 based receiver may adjust a signal level of an input signal, perform symbol recovery with respect to the adjusted signal level, and perform frame detection, SF detection, frame combination, and PLheader detection interactively.

The DVB-S2 receiver may perform at least one of frequency correction, PL descrambling, signal to noise ratio (SNR) estimation, phase recovery, soft-decision decoding, and LDPC decoding.

According to another aspect of the present invention, there is also provided an operating method of a DVB-S2 based transmission and reception apparatus, the method including determining, by a mapping unit, bit mapping based on at least one of a state of a transmission channel and an area to be applied, and repeating, by a PLframe replica processing unit, a PLframe in which a PLheader corresponding to an SF is inserted.

The method may further include adjusting a signal level of an input signal, performing symbol recovery with respect to the adjusted signal level, and performing frame detection, SF detection, frame combination, and PLheader detection interactively.

The method may further include performing at least one of frequency correction, PL descrambling, SNR estimation, phase recovery, soft-decision decoding, and LDPC decoding.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
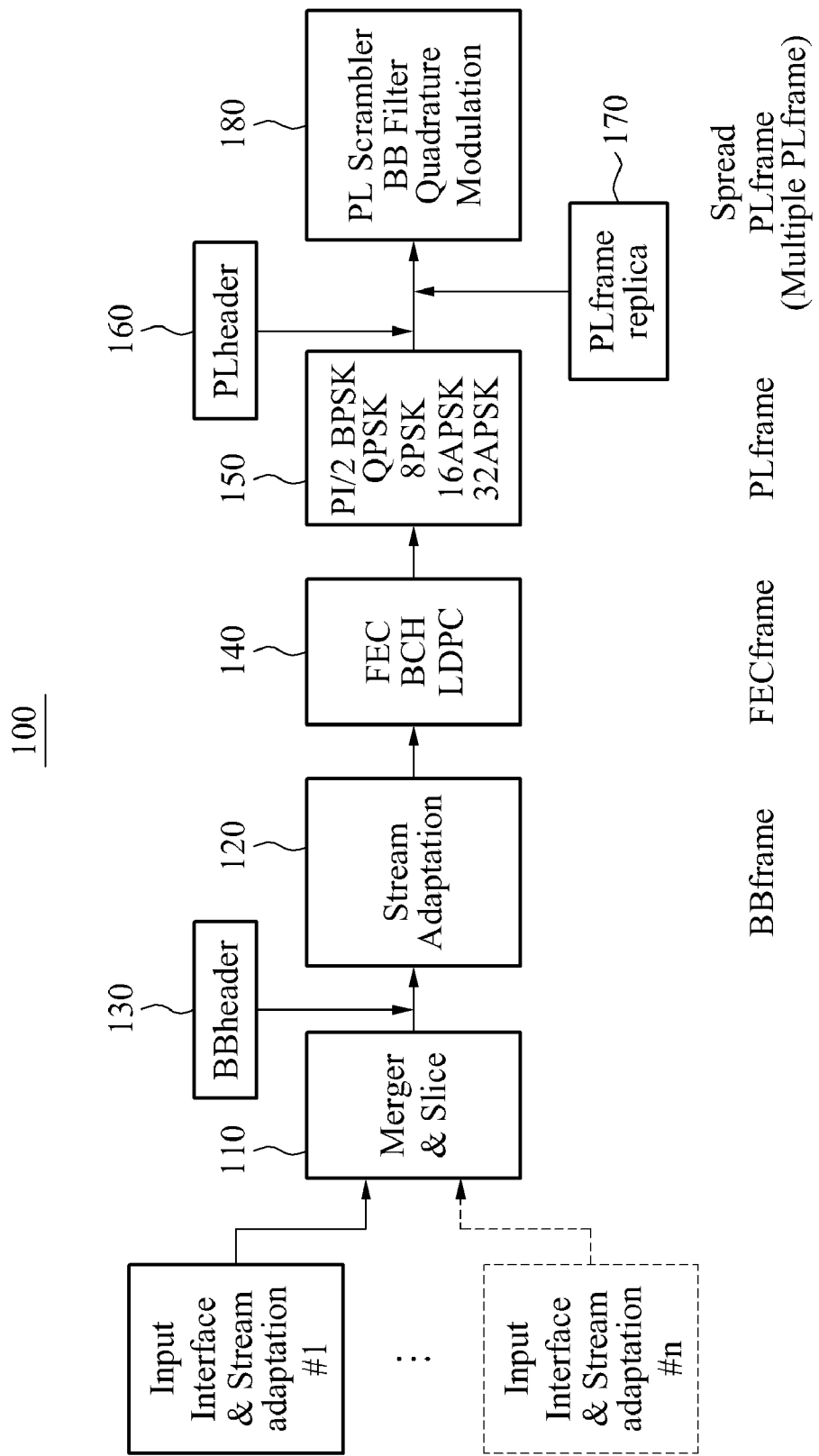
FIG. 1 is a block diagram illustrating a digital video broadcasting-satellite-second generation (DVB-S2) based transmission and reception apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined that a detailed description is related to a related known function or configuration which may make the purpose of the present invention unnecessarily ambiguous in the description of the present invention, such a detailed description will be omitted. Also, terminologies used herein are defined to appropriately describe the exemplary embodiments of the present invention and thus may be changed depending on a user, the intent of an operator, or a custom. Accordingly, the terminologies must be defined based on the following overall description of this specification.

FIG. 1 is a block diagram illustrating a digital video broadcasting-satellite-second generation (DVB-S2) based transmission and reception apparatus 100 according to an embodiment of the present invention.

Referring to FIG. 1, the DVB-S2 based transmission and reception apparatus 100 may include configurations 150 and 170 for performing a band spread transmission function in DVB-S2 transceivers 110, 120, 130, 140, 160, and 180.

FIG. 1 illustrates an example of the DVB-S2 based transmission and reception apparatus 100. A conventional transceiver may include an input stream interface, a merger and slice configuration unit, a base-band header (BBheader) inserting unit, a stream adaptation unit, a forward error correction (FEC) encoding unit, for example, a Bose, Chandhuri, and Hocquengham (BCH)+low-density parity-check (LDPC) encoding unit, a modulation unit and physical layer frame (PLframe) configuration unit, a physical layer header (PLheader) inserting unit, a physical layer (PL) scrambler, a BB filter, and a quadrature modulation unit. Herein, the present invention may be implemented by adding a phase shift keying (PSK) modulation and PLframe replica technology to the conventional transceiver.

In particular, the DVB-S2 based transmission and reception apparatus 100 may include a mode adaptation unit 110, a stream adaptation unit 120, an FEC encoding unit 140, a mapping unit 150, a PLheader processing unit 160, a PLframe replica processing unit 170, and a PL framing and modulation unit 180.

The mode adaptation unit 110 may be determined based on applications. The mode adaptation unit 110 may perform an input stream interface, input stream recovery, null-packet removal for a transport stream (TS) input format and an adaptive coding and modulation (ACM) mode, cyclic redundancy check (CRC)-8 encoding for error detection, an input stream mixing function for multiple input streams, and the like. As a format for configuring a frame, a BBheader 130 may be applied at a front end of a data field in order to inform a receiver of a form of the mode adaptation unit 110 and a format of an input stream.

The stream adaptation unit 120 may perform padding, BB scrambling, and the like for generating a BBframe.

The FEC encoding unit 140 may configure an FEC code block to have a length of 64,800 bits or 16,200 bits, depending on an application, while performing error correction using an external code corresponding to a BCH code and an internal code corresponding to an LDPC code of various encoding rates.

In addition, the FEC encoding unit 140 may perform bit interleaving in 8-phase shift keying (PSK), 16-amplitude phase shift keying (APSK), and 32-APSK modulations, and may not perform the bit interleaving in binary phase shift keying (BPSK), and quadrature phase shift keying (QPSK) modulations.

The mapping unit 150 may perform π/2 BPSK, QPSK, 8-PSK, 16-APSK, and 32-APSK constellations, and determine bit mapping based on at least one of a state of a transmission channel and an area to be applied. In particular, the mapping unit 150 may configure a spread frame having a length of 16,290 bits by adding a PLheader through π/2 BPSK modulation and 16K LDPC encoding, and replace an existing modulation and coding (MODCOD) frame with the configured spread frame.

In order to achieve a low bit error rate, gray mapping may be performed in π/2 BPSK, QPSK, and 8-PSK constellations.

The PLheader processing unit 160 may insert a PLheader into the replaced spread frame, and the PLframe replica processing unit 170 may repeat a PLframe in which the PLheader corresponding to a spreading factor (SF) is inserted.

The PL framing and modulation unit 180 may configure a PLframe by performing synchronization with an FEC frame corresponding to a block code, inserting a dummy frame, as necessary, in order to maintain a symbol rate, and inserting a pilot symbol for carrier recovery of a receiver, a PLheader corresponding to modulation/encoding rate information, and frame synchronization. In addition, the PL framing and modulation unit 180 may perform PL scrambling for energy dispersion.

The DVB-S2 based transmission and reception apparatus 100 may expand from a conventional DVB-S2 waveform, with a 16K FEC frame.

A 16K frame may produce more excellent performance than a 64K frame, and have a PLframe of an identical length in MODCOD rate of the conventional DVB-S2 waveform.

Figure 2:
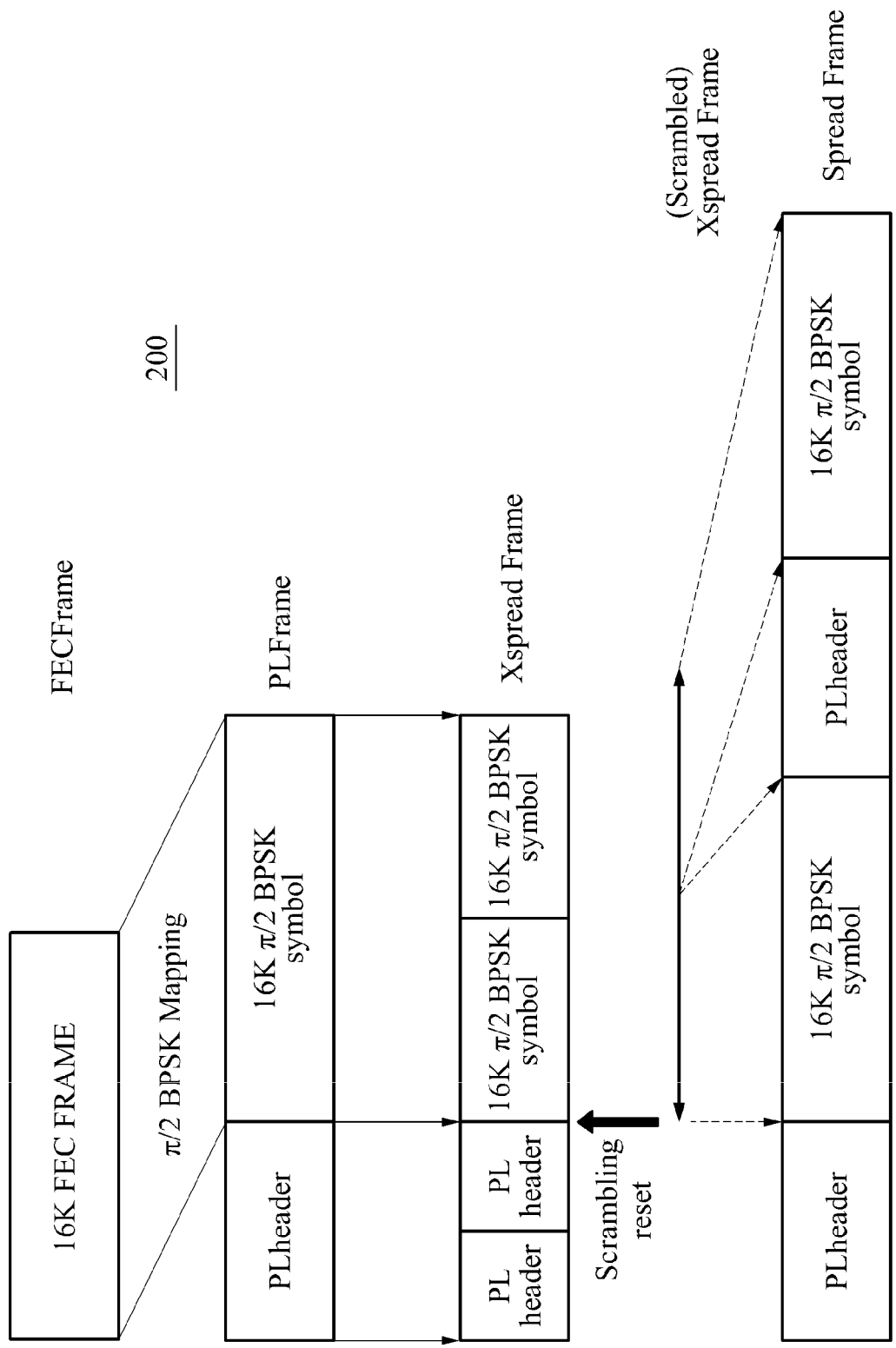
FIG. 2 is a diagram illustrating a frame structure to be used in a DVB-S2 based transmission and reception apparatus according to an embodiment of the present invention.

Accordingly, as shown in FIG. 2, when a PSK is newly introduced for a low SNR operation, a PLframe may have a length corresponding to a total of 16,290 symbols, along with a length of a PLheader.

FIG. 2 is a diagram illustrating a frame structure 200 to be used in a DVB-S2 based transmission and reception apparatus according to an embodiment of the present invention. 16,290 symbols may be identical to a PLframe of a Nonpilot mode, a 16K frame, and a 16-APSK modulation scheme. Accordingly, when a frame described herein is input, a conventional receiver may perform MODCOD detection and may maintain recovery of a reception signal, for example, frame synchronization, and the like, although a single frame may be lost due to a failure of LDPC decoding.

Accordingly, generation of a frame for a low SNR operation may be implemented as shown in the frame structure 200 of FIG. 2.

A number of replica of a frame may be determined based on an SF.

A DVB-S2 based transmission and reception apparatus may include MODCODs Nos. 18 to 23 of a conventional DVB-S2 16-APSK modulation scheme, as shown in Table 1.

TABLE 1

| Mode | MODCOD | The MSB of the TYPE field (16K/64K) | The MSB of the TYPE field (Pilot/Nonpilot) |
|---|---|---|---|
| π/2BPSK ¼ and Spreading Factor(SF) 1 | 18D | 1 | 0 |
| π/2BPSK ⅓ and Spreading Factor(SF) 1 | 19D | 1 | 0 |
| π/2BPSK ¼ and Spreading Factor(SF) 2 | 20D | 1 | 0 |
| π/2BPSK ⅓ and Spreading Factor(SF) 2 | 21D | 1 | 0 |
| π/2BPSK ¼ and Spreading Factor(SF) 3 | 22D | 1 | 0 |
| π/2BPSK ⅔ and Spreading Factor(SF) 3 | 23D | 1 | 0 |

Figure 3:
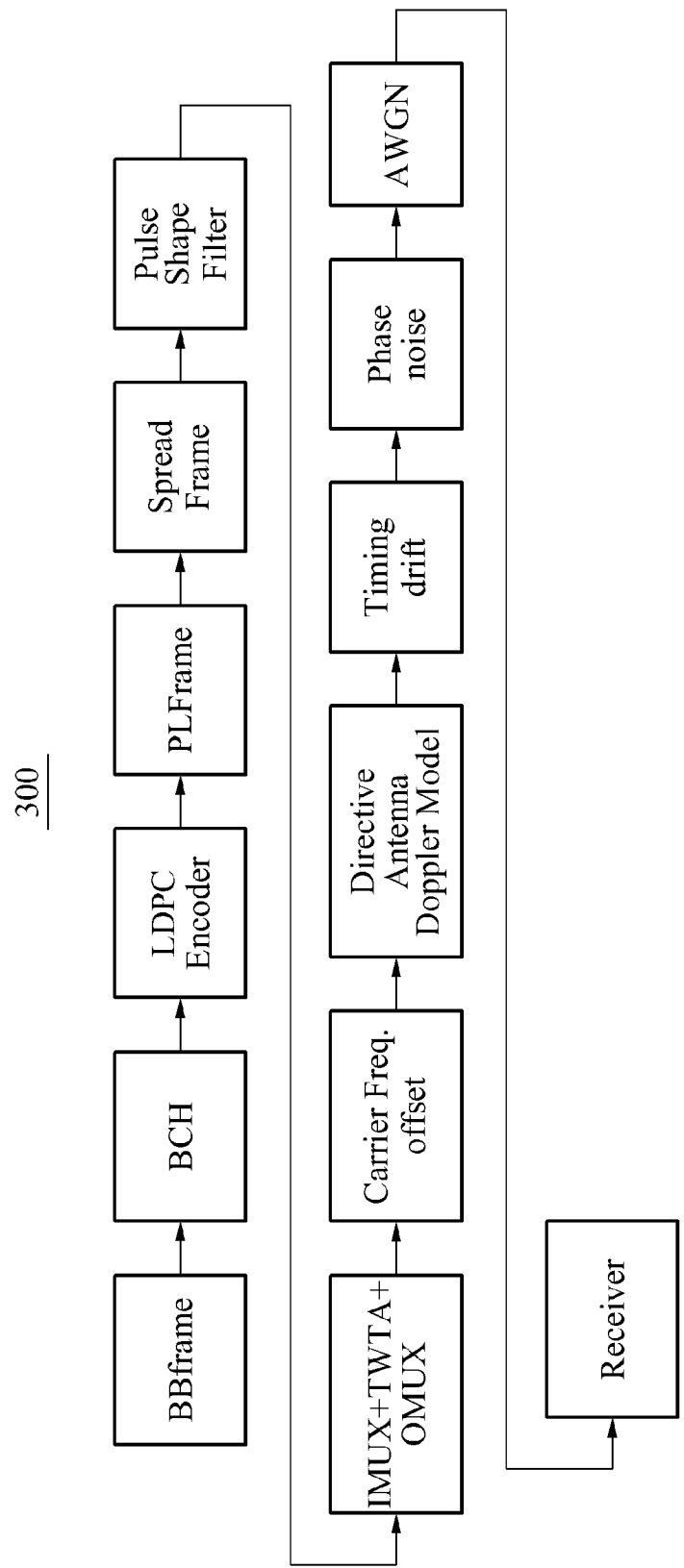
FIG. 3 is a diagram illustrating a link structure to be used in a DVB-S2 based transmission and reception apparatus according to an embodiment of the present invention.

FIG. 3 is a diagram illustrating a link structure 300 to be used in a DVB-S2 based transmission and reception apparatus according to an embodiment of the present invention.

FIG. 3 illustrates a configuration of a channel link and a transceiver according to an embodiment of the present invention. A BBframe refers to a frame configured based on an output of the stream adaptation unit 120 of FIG. 1, and BCH encoding and LDPC encoding may be performed to generate a PLframe.

A spread frame may be generated, and a pulse shape filter, a satellite relay model (an input multiplexer (MUX), a traveling wave tube amplifier (TWTA), and an output MUX) may be configured.

A frequency error (a carrier frequency offset), a Doppler error (a directive antenna Doppler model), a timing error (a timing drift), phase noise, white noise (additive white Gaussian noise (AWGN)), and the like may be added and input into a receiver.

Figure 4:
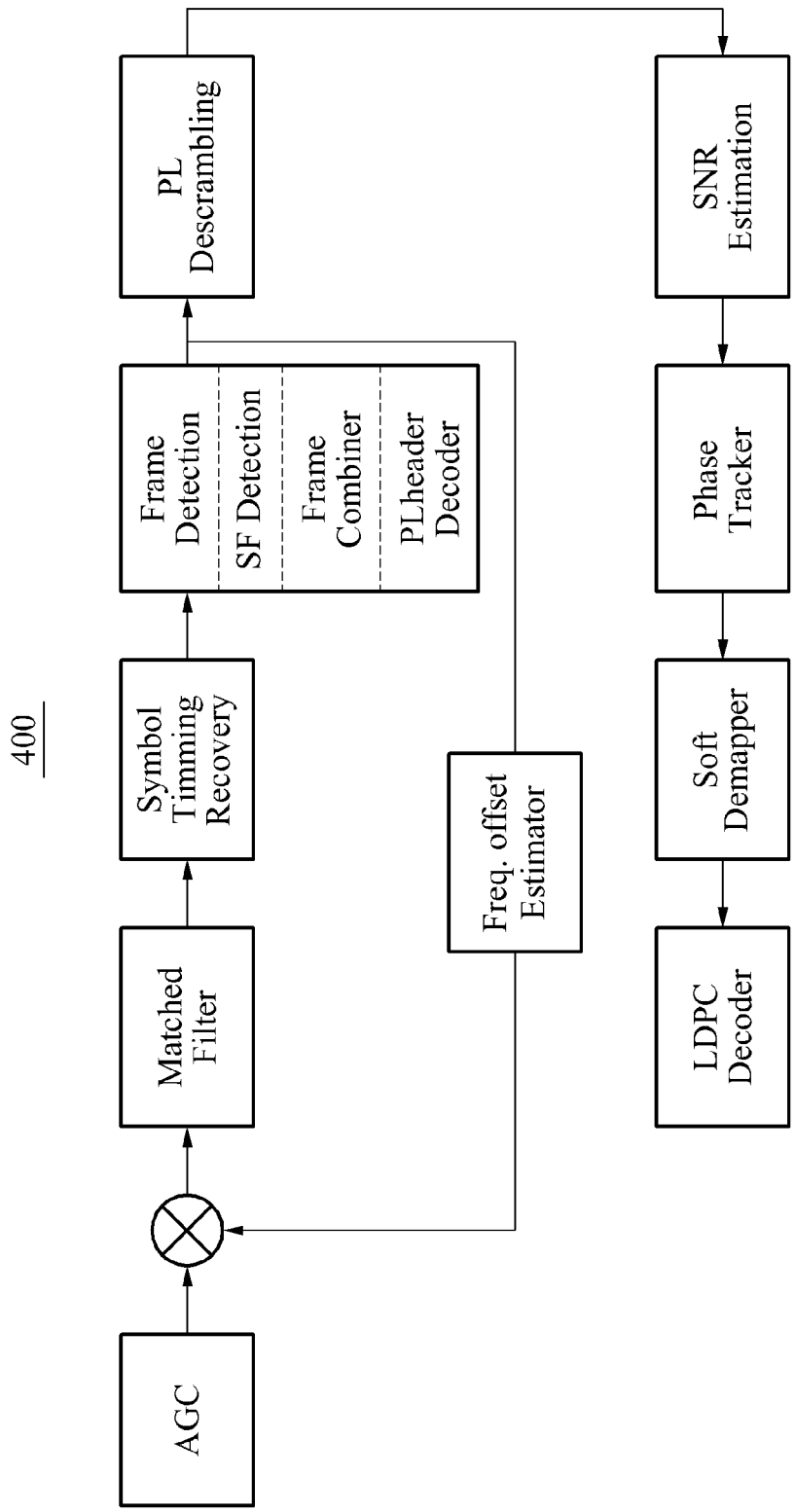
FIG. 4 is a block diagram illustrating a receiver of a DVB-S2 based transmission and reception apparatus according to an embodiment of the present invention.

FIG. 4 is a block diagram illustrating a receiver 400 of a DVB-S2 based transmission and reception apparatus according to an embodiment of the present invention.

Referring to FIG. 4, the receiver 400 may include an automatic gain control (AGC) unit, a matched filter, a symbol timing recovery unit, a frame detection unit, an SF detection unit, a PLheader decoder, and a PL descrambling unit.

The AGC unit may adjust a signal level of an input signal by AGC, the matched filter may process the input signal of which the signal level is adjusted, and the symbol timing recovery unit may perform symbol recovery.

The frame detection unit may detect a frame, and the SF detection unit may detect an SF.

The PLheader decoder may combine frames and detect a PLheader interactively.

The PL descrambling unit may process frequency correction and PL descrambling.

In addition, the receiver 400 may perform SNR estimation, phase recovery as a phase tracker, soft-decision decoding as a soft demapper, and LDPC decoding as an LDPC decoder. A characteristic of the present invention is that frame detection, SF detection, frame combination, and PLheader detection may be performed interactively.

Figure 5:
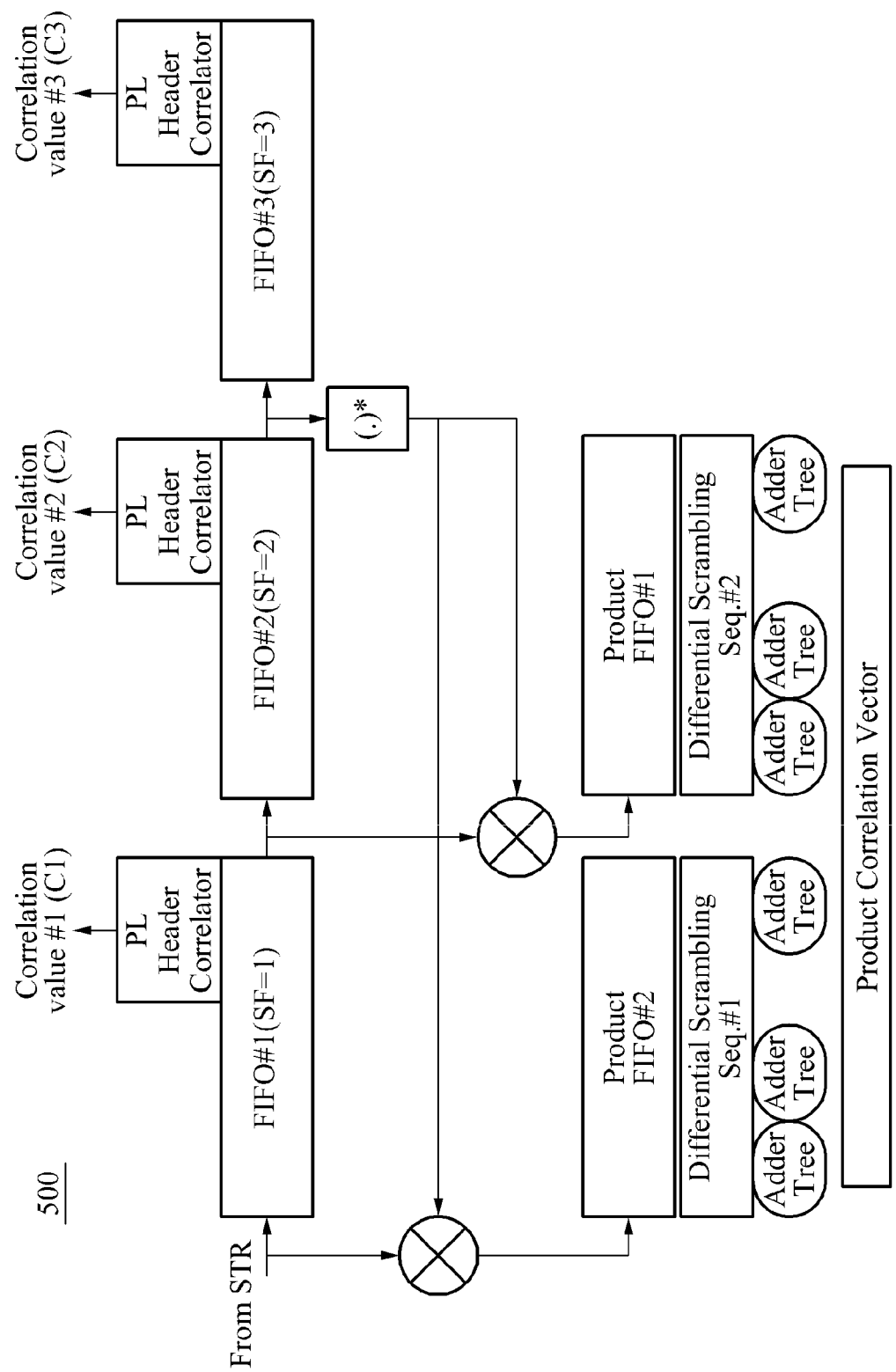
FIG. 5 is a diagram illustrating a structure for detecting combined frames of a DVB-S2 based transmission and reception apparatus according to an embodiment of the present invention.

FIG. 5 is a diagram illustrating a structure 500 for detecting combined frames of a DVB-S2 based transmission and reception apparatus according to an embodiment of the present invention.

FIG. 5 illustrates a characteristic configuration of FIG. 4 in detail.

In the structure 500, a maximum of three identical frames may be newly input. In this example, two frames or a single frame may be input.

Figure 6:
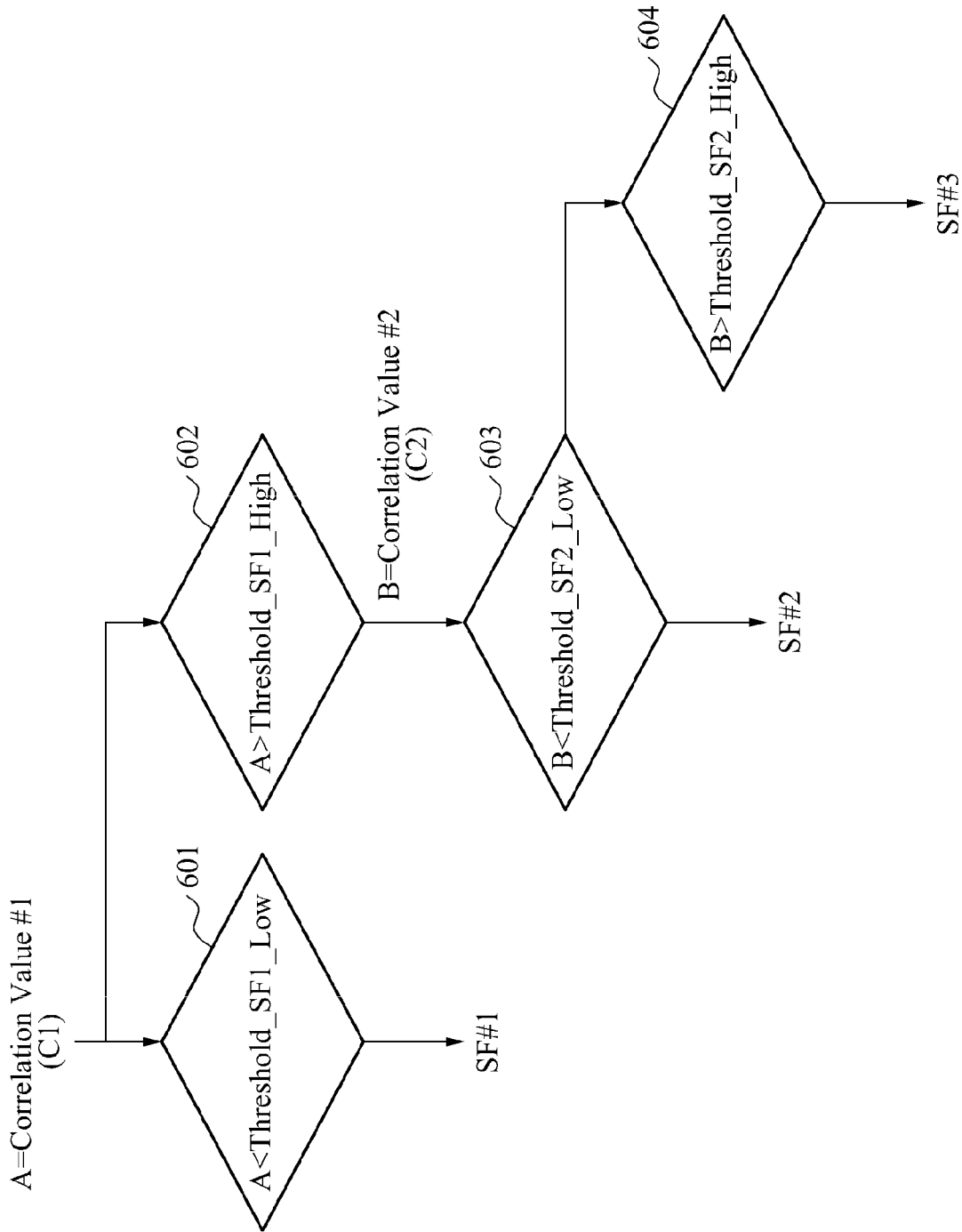
FIG. 6 is a diagram illustrating a spreading factor (SF) detector of a DVB-S2 based transmission and reception apparatus according to an embodiment of the present invention.

Accordingly, a determination process of FIG. 6 may be performed through output values of a correlator in the structure 500 of FIG. 5.

FIG. 6 is a diagram illustrating an SF detector of a DVB-S2 based transmission and reception apparatus according to an embodiment of the present invention.

Referring to FIG. 5 again, C1 denotes a correlation value obtained at first-in, first-out (FIFO)#1, C2 denotes a correlation value obtained at FIFO#2, and C3 denotes a correlation value obtained at FIFO#3. In this example, as shown in FIG. 6, the determination may be performed based on a threshold value set for each case.

In particular, the SF detector may compare C1 to Threshold_SF1_Low and Threshold_SF1_High, simultaneously. When C1 is less than Threshold_SF1_Low, the SF detector may determine an SF to be SF#1, in operation 601.

In operation 602, the SF detector may determine whether C1 is greater than Threshold_SF1_High. When C1 is greater than Threshold_SF1_High, the SF detector may compare C2 to Threshold_SF2_Low, in operation 603. When C2 is less than Threshold_SF2_Low, the SF detector may determine the SF to be SF#2. When C2 is greater than Threshold_SF2_Low, the SF detector may determine whether C2 is greater than Threshold_SF2_High, in operation 604. When C2 is greater than Threshold_SF2_High, the SF detector may determine the SF to be SF#3. When C2 is less than Threshold_SF2_High, the SF detector may defer the determination.

A frequency error may be estimated through a product correlation vector that completes correlation, using a 4096 FFT based Rife & Boorstyne algorithm. Also, the frequency error may be corrected by AFC.

When the frequency error is corrected and phase correction is performed after the SF is determined, a PLheader may be combined to detect MODCOD data.

In particular, an SNR to be demodulated by 16-APSK through a value of an SNR estimator may be greater than or equal to 7 dB. In this example, when SF=1 is detected by a conventional frame detector, a frame structure may be recognized as a conventional DVB-S2 frame structure, PLS may be detected, and decoding may not be performed in a data section.

However, when the SNR is less than or equal to 7 dB, and SF=1, 2, or 3 is detected, the frame may be regarded a frame for transmission with a low SNR, frames may be combined to increase the SNR, and PLS detection may be performed.

In this instance, since whether a pilot exists and a length of a 16K frame are determined, MODCOD decoding may be performed. In so doing, a gain of about 1 dB may be obtained, when compared to a conventional manner, as shown in FIG. 7.

Figure 7:
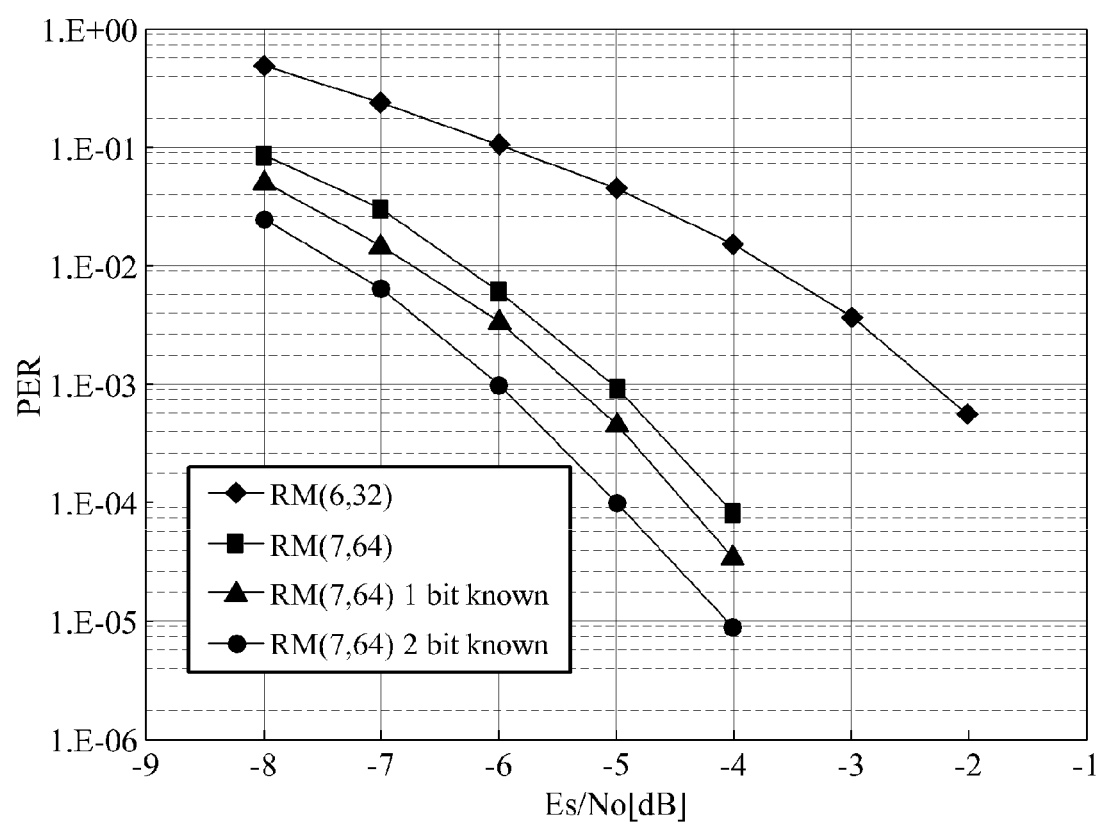
FIG. 7 is a graph illustrating applicable physical layer signaling (PLS) decoding performance according to an embodiment of the present invention.

FIG. 7 is a graph 700 illustrating applicable PLS decoding performance according to an embodiment of the present invention.

Figure 8:
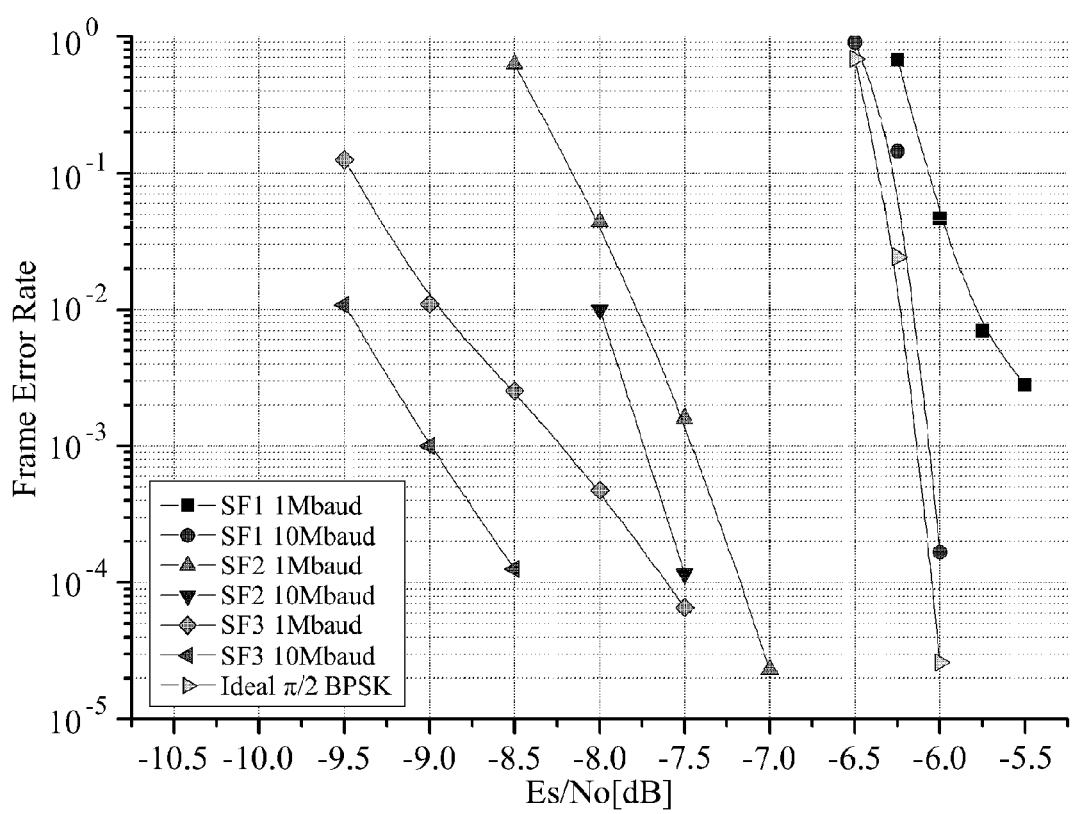
FIG. 8 is a graph illustrating a frame error rate to energy per symbol over noise density (Es/No) based on a symbol rate and an SF according to an embodiment of the present invention.

In a case of frame combination based restoration, performance loss may occur a bit due to an issue of SNR loss when frames are combined based on a drift of a phase and phase noise, when compared to an ideal case of FIG. 8.

FIG. 8 is a graph 800 illustrating a frame error rate to energy per symbol over noise density (Es/No) based on a symbol rate and an SF according to an embodiment of the present invention.

Referring to FIG. 8, when a symbol rate is great, performance loss may be reduced.

According to an embodiment of the present invention, a satellite transceiver operable in an environment of a low SNR may be implemented.

According to an embodiment of the present invention, the apparatus and method described herein may be applied to a conventional DVB-S2 based network.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A digital video broadcasting-satellite-second generation (DVB-S2) based transmission and reception apparatus, comprising:
   a DVB-S2 based transmitter;
   a mapping unit to determine bit mapping based on at least one of a state of a transmission channel and an area to be applied;
   a physical layer frame (PLframe) replica processing unit to repeat a PLframe in which a physical layer header (PLheader) corresponding to a spreading factor (SF) is inserted, and
   a PLheader processing unit to configure a spread frame having a length of 16,290 bits by adding the PLheader through $\pi/2$ BPSK modulation and 16K low-density parity-check (LDPC) encoding, and replace an existing modulation and coding (MODCOD) frame with the configured spread frame.

2. The apparatus of claim 1, wherein the mapping unit performs at least one of $\pi/2$ binary phase shift keying (BPSK), quadrature phase shift keying (QPSK), 8-phase shift keying (PSK), 16-amplitude phase shift keying (APSK), and 32-APSK constellations.

3. The apparatus of claim 1, wherein the mapping unit performs gray mapping in $\pi/2$ BPSK, QPSK, and 8-PSK constellations.

4. The apparatus of claim 1, further comprising:
   a physical layer (PL) framing and modulation unit to configure a PLframe by performing synchronization with a forward error correction (FEC) frame corresponding to a block code, inserting a dummy frame in order to maintain a symbol rate, and inserting a pilot symbol for carrier recovery of a receiver, a PLheader corresponding to modulation/encoding rate information, and frame synchronization.

5. The apparatus of claim 1, further comprising:
   a DVB-S2 based receiver.

6. The apparatus of claim 5, wherein the DVB-S2 based receiver adjusts a signal level of an input signal, performs symbol recovery with respect to the adjusted signal level, and performs frame detection, SF detection, frame combination, and PLheader detection interactively.

7. The apparatus of claim 5, wherein the DVB-S2 receiver performs at least one of frequency correction, PL descrambling, signal to noise ratio (SNR) estimation, phase recovery, soft-decision decoding, and LDPC decoding.

8. An operating method of a digital video broadcasting-satellite-second generation (DVB-S2) based transmission and reception apparatus, the method comprising:
   determining, by a mapping unit, bit mapping based on at least one of a state of a transmission channel and an area to be applied;
   repeating, by a physical layer frame (PLframe) replica processing unit, a PLframe in which a physical layer header (PLheader) corresponding to a spreading factor (SF) is inserted;
   adding the PLheader through $\pi/2$ BPSK modulation and 16K low-density parity-check (LDPC) encoding to configure a spread frame having a length of 16,290 bits; and
   replacing an existing modulation and coding (MODCOD) frame with the configured spread frame.

9. The method of claim 8, further comprising:
   adjusting a signal level of an input signal, performing symbol recovery with respect to the adjusted signal level, and performing frame detection, SF detection, frame combination, and PLheader detection interactively.

10. The method of claim 8, further comprising:
    performing at least one of frequency correction, physical layer (PL) descrambling, signal to noise ratio (SNR) estimation, phase recovery, soft-decision decoding, and low-density parity-check (LDPC) decoding.

* * * * *